(12) United States Patent
Ding et al.

(10) Patent No.: US 8,981,647 B2
(45) Date of Patent: Mar. 17, 2015

(54) LIGHTING SYSTEM

(75) Inventors: Chao Ding, Shanghai (CN); Frank Huang, Shanghai (CN); Francois Darsy, Dreux (FR); Timothy Zhang, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/821,276

(22) PCT Filed: Sep. 2, 2011

(86) PCT No.: PCT/IB2011/053845
§ 371 (c)(1),
(2), (4) Date: Mar. 7, 2013

(87) PCT Pub. No.: WO2012/035460
PCT Pub. Date: Mar. 22, 2012

(65) Prior Publication Data
US 2013/0175925 A1 Jul. 11, 2013

(30) Foreign Application Priority Data

Sep. 14, 2010 (WO) ................ PCT/CN2010/076877

(51) Int. Cl.
*B60Q 1/00* (2006.01)
*B60Q 1/28* (2006.01)
*B60Q 11/00* (2006.01)

(52) U.S. Cl.
CPC ............. *B60Q 1/0017* (2013.01); *B60Q 1/28* (2013.01); *B60Q 11/005* (2013.01); *B60Q 2400/30* (2013.01); *B60Q 2900/10* (2013.01)
USPC .................. 315/77; 315/76; 315/80; 315/82; 315/83

(58) Field of Classification Search
CPC ..................... B60Q 2200/00; B60Q 2300/142; B60Q 2300/00; B60Q 1/28; B60Q 1/0017; B60Q 2900/10; B60Q 11/005; B60Q 2400/30
USPC ..................................... 315/76, 77, 80, 82, 83
See application file for complete search history.

(56) References Cited

U.S. PATENT DOCUMENTS

| 5,841,203 A * | 11/1998 | Chambers et al. ........... 307/10.8 |
| 6,879,248 B2 * | 4/2005 | Flick ............................ 340/435 |
| 7,382,241 B1 | 6/2008 | Huang et al. |

(Continued)

FOREIGN PATENT DOCUMENTS

| DE | 202006002061 U1 | 2/2006 |
| DE | 202006009693 U1 | 8/2006 |

(Continued)

*Primary Examiner* — Douglas W Owens
*Assistant Examiner* — Thai Pham

(57) ABSTRACT

To satisfy the need for refitting the lighting of a vehicle without the need to modify the controlling system of the vehicle, the present invention proposes a lighting system which comprises an electrical element (110), configured to consume the received power and incapable of emitting light; a light source (130); and a controller (120), configured to receive a first signal indicating the working status of the electrical element (110) and control the light source (130) generating a first light and a second light, respectively, based on the first signal. By utilizing the signal indicating the working status of the electrical element (110), which element is used to replace another automotive lamp, the controller can control the light source (130) to mimic said another automotive lamp while performing its original function.

19 Claims, 2 Drawing Sheets

(56) References Cited

U.S. PATENT DOCUMENTS

2008/0007180 A1* 1/2008 Kesterson ................. 315/82
2013/0176121 A1* 7/2013 Tsai ........................ 340/475

FOREIGN PATENT DOCUMENTS

FR 2939213 A1 11/2008
WO 2011138708 A1 11/2011

* cited by examiner

LIGHTING SYSTEM

FIELD OF THE INVENTION

The present invention relates to a lighting system, in particular an automotive lighting system.

BACKGROUND OF THE INVENTION

In the current vehicles, normally several lights are equipped for different functions, such as low beam lights, high beam lights, fog lights, reversing light, etc. With the increasing need for individuated and innovative decoration of vehicles, refitting the light systems pre-installed by vehicle manufactures becomes a growing market, especially using LED lamps to replace the previously installed lamps. In view of other aspects, due to the application of new functions, like the introduction of Daytime Running Light (DRL), the requirement of refitting the current lighting system of the already-sold vehicles to fulfill the new regulations must be complied with.

It may be easy for a manufacturer to modify the whole electrical system and lighting system of a vehicle to integrate a new light into the current automotive lighting system in the manufacturing process, however it is difficult for a refitting technician to modify the electrical system and/or lighting system of a vehicle, especially when the vehicle is equipped with a detection system capable of detecting any "failure" of electrical elements or lights, which may result in a warning and/or flameout. Therefore, there is a need to have a method to "meet" or "cheat" the detection system when refitting the lighting system of a vehicle.

SUMMARY OF THE INVENTION

It is an object of the present invention to provide a refit lighting system for vehicles, particularly to fulfill the detection conditions of a detection system, so that the detection system "believes" the "replaced" light "still exists and is in the right working status", more particularly to use one light to fulfill more than one function, e.g., integrating the function of the "replaced" light into the new refit light system.

The present inventors have found that if the power fed to the "replaced" light bulb is substantially consumed, the detection system will conclude that the light bulb "exists" and is in the right working status. Therefore, the inventors propose to use a power-consumption element, e.g., resistor, electric circuit, wireless transmitter, to replace the target light bulb and consume the received power. As a result, the power and/or corresponding enabling/disabling signal will be sent or not to the "replaced" light bulb to actuate or turn off the light bulb. Then, the power signal and/or the enabling/disabling signal can be extracted and used by the refit lighting system to control another light.

According to one embodiment of the present invention, there is provided a lighting system comprising: an electrical element configured to consume the received power and incapable of emitting light; a light source; and a controller configured to receive a first signal indicating the working status of the electrical element and control the light source generating a first light and a second light, respectively, based on the first signal.

The basic idea of the embodiment is to provide an electrical element, for example, a resistance circuit, having substantially the same power consuming capacity as a target "replaced" light source, for example, a position light. Consequently, when "standard" or "normal" power is fed to and substantially consumed by the electrical element, which replaced the target light source, the detection system cannot detect the replacement, and will conclude that the "replaced" light source exists and works well. As a result, no warning signal will be generated.

Although the electrical element is described as being "incapable of emitting light", a person skilled in the art should understand that the term "incapable of emitting light" should be interpreted to mean that the electrical element should not generate light strong enough to be seen as a functioning light of a vehicle, like position light, fog light, reversing light, etc, which further means that it is possible that the electrical element generates light having a low intensity or a quite limited illumination distance or a quite limited illumination area, and which light cannot be interpreted as a functioning automotive light.

In another embodiment, the first signal represents any one of the status according to which power is fed to the electrical element or the status according to which an enable signal is transmitted to the electrical element.

In another embodiment, the first signal is obtained from a cable connected to the electrical element or is transmitted from the electrical element to the controller in a wireless manner.

The present inventors also found that, in some vehicles, some different light sources have a synchronized, or even the same, working status, for example, the working status of low beam lights and/or the license-plate light is synchronized with the working status of the position light. Thus, if the position light is replaced by the electrical element, it is also practical to receive the first signal from the cable connected to the low beam light, instead of from the cable connected to "the position light". Therefore, in another embodiment, the first signal is obtained from a second light source having a synchronized working status as the electrical element.

In another embodiment, the first light has a first intensity when the working status of the electrical element is OFF, and the second light has a second intensity when the working status of the electrical element is ON. The basic idea here is to use the first light source to mimic the replaced light source when the working status of the electrical element, i.e., the expected working status of the "replaced" light source, is ON, and use the first light source to perform its original designed function when the working status of the electrical element is OFF. Consequently, it is possible to save one set of light sources, thereby saving costs, or to use a new designed light source to replace an outdated light source.

In another embodiment, there is provided a method comprising the steps of: receiving a first signal indicating the working status of an electrical element, wherein the electrical element is configured to consume the received power and is incapable of emitting light; and controlling a light source to generate a first light or a second light, based on the first signal.

These and other aspects of the invention will be apparent from and elucidated with to the embodiment described hereinafter.

BRIEF DESCRIPTION OF THE DRAWINGS

The above and other objects and features of the present invention will become more apparent from the following detailed description considered in connection with the accompanying drawings, in which.

The same reference numerals are used to denote similar parts throughout the Figures.

EMBODIMENTS OF THE INVENTION

Figure 1:
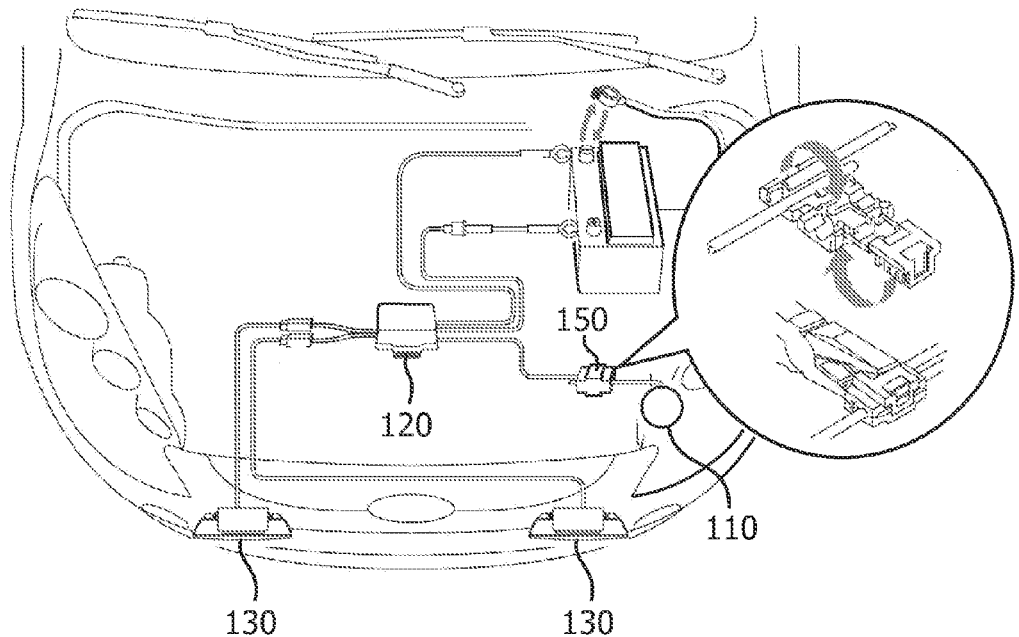
FIG. 1 illustrates a symbolical representation of the front side of a vehicle with schematically shown connections and components of an embodiment of a lighting system.

FIG. 1 illustrates an embodiment of using a set of DRL lights to incorporate the functions of DRL lights and position lights, according to one embodiment of the present invention. The automotive lighting system shown in FIG. 1 comprises the electrical element 110, the controller 120 and the light source 130. The electrical element 110 is placed in the socket of the position light and replaces the position light. The basic requirement is that the electrical element 110 can consume the received power, at least most of the power. It is not necessary for the whole vehicle system to be involved in the replacement of the position light, and it works in the "normal way", i.e., feeding the power as required by a position light through a cable to the "position light", actually the electrical element 110. The controller 120 can obtain the first signal indicating "the working status of the position light", i.e., the working status of the electrical element, from the cable connected to the electrical element. When the electrical element comprises a wireless transmitter or transceiver, it is also practical to transmit the first signal from the electrical element to the controller 120. Normally, the working status of the electrical element depends on whether or not power is fed to the electrical element 110. If power is fed to the electrical element 110, the working status is ON; if no power is fed to the electrical element 110, the working status is OFF. However, the person skilled in the art should understand that other types of information can also represent the working status of the electrical element. For example, an enable signal can be sent to the electrical element 110 for the purpose of turning on the "position light", in which case the working status of the electrical element is ON; and a disabling signal can be sent, or no enable signal is sent, to the electrical element 110 for the purpose of turning off the "position light", in which case the working status of the electrical element is OFF. Consequently, the first signal can be utilized by the controller 120 to control the working status of the light source 130, e.g., to generate a first light or a second light respectively based on the first signal. According to the European regulation, when the position light is ON, the DRL light should be OFF; when the position light is OFF, the DRL light can be ON. In the current embodiment, when power or an enable signal is fed to the electrical element 110, i.e., the replaced position light, the first signal will be ON, and the controller 120 will control the light source 130 to generate the second light to mimic the position light; when no power or no enable signal is fed to the electrical element 110, the first signal will be OFF, and the controller 120 can control the light source 130 to generate the first light to form the DRL light. The first light and the second light can be different in intensity, distribution form, number of powered bulbs, etc. For example, the light source 130 can comprise a plurality of LED lamps. When it is configured to generate the first light, i.e., to generate the DRL light, all the LED lamps can be turned on and generate a first intensity. When the light source 130 is configured to generate the second light, i.e., to mimic the position light, part of the LED lamps can be turned on, or all the LED lamps can be turned on but generate a different light intensity.

In another embodiment, the lighting system further comprises a detector 140, configured to detect the power consumption of the electrical element and generate a warning message when the electrical element is incapable of consuming the power. Normally the detector 140 is integrated in the controlling system of a vehicle. With the present invention, there is no need to modify the controlling system, which makes the refitting operation easier. A person skilled in the art should understand that the apparatus and method of the present invention are also appropriate for vehicles without the function of lamp failure detection.

FIG. 1 illustrates a "one touch connector" 150, which is used to obtain the first signal from the cable connected to the electrical element 110. A person skilled in the art should understand that other types of wire-connection are also applicable to implement the present invention.

Although not shown in FIG. 1, a person skilled in the art should also understand that, for the purpose of obtaining the working status of a target light source, like a position light, it is possible to obtain the signal from another source, such as the cable connected to the low beam light or the cable connected to the license-plate light, instead of from the cable connected to the "replaced" position light.

A person skilled in the art also should understand that even though in the embodiments of FIG. 1, position light is used as an example of "replaced" target light and DRL light is used as an example of "the light source" 130, the present invention and its basic idea should cover other applicable automotive light, especially in the automotive light refit market.

Figure 2:
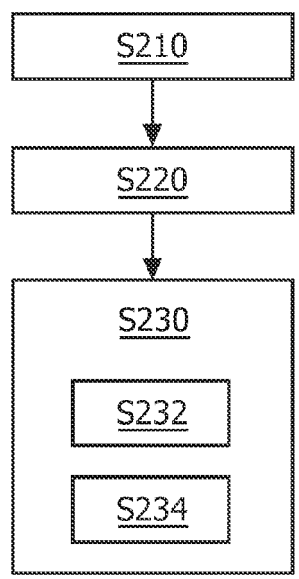
FIG. 2 illustrates a flow chart of a method according to one embodiment of the present invention.

FIG. 2 illustrates an exemplary flow chart of a method according to one embodiment of the invention. The method comprises the core steps of: step S220 of receiving a first signal indicating the working status of an electrical element, wherein the electrical element is configured to consume the received power and is incapable of emitting light, and step S230 of controlling a light source to generate a first light or a second light, based on the first signal. In a further embodiment, the method further comprises Step S210 of detecting the power consumption of the electrical element and generating a warning message when the electrical element cannot consume the fed power. Step S210 is not necessary, especially in vehicles without the function of lamp (or light) failure detection. In another embodiment, step S230 comprises two steps: step S232 of generating the first light having a first intensity when the working status of the electrical element is OFF; and step S234 of generating the second light having a second intensity when the working status of the electrical element is ON.

Figure 3:
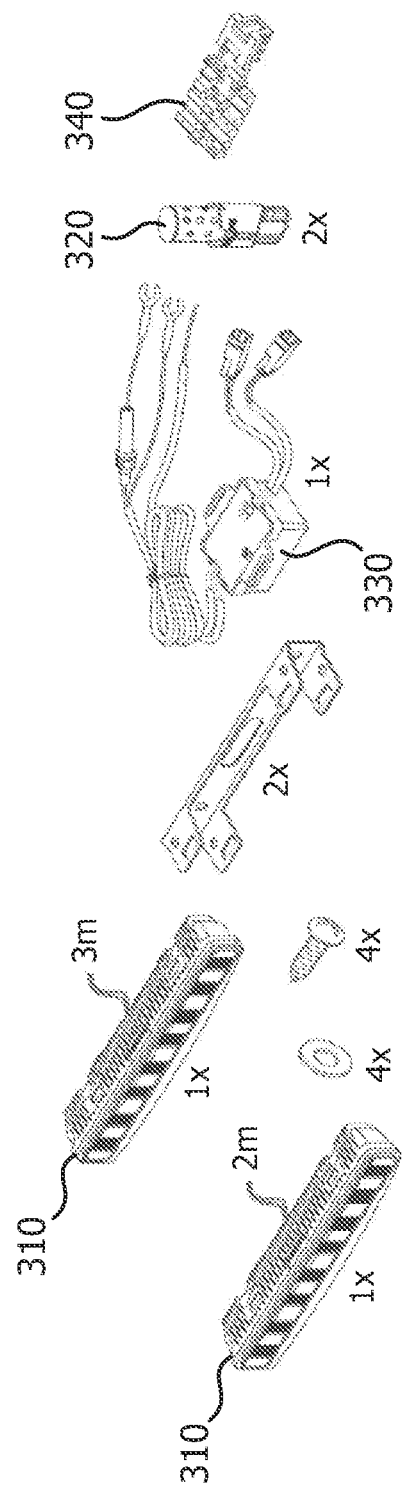
FIG. 3 illustrates a Philips DRL toolset according to one embodiment of the present invention.

FIG. 3 illustrates a Philips DRL toolset, which can be used to incorporate the function of position lighting into the DRL light. Module 310 is the DRL light, and module 320 is the electrical element, module 330 is the controller, module 340 is the one touch connector to connect the cable feeding power to module 320.

It should be noted that the above-mentioned embodiments illustrate rather than limit the invention and that those skilled in the art will be able to design alternative embodiments without departing from the scope of the appended claims. The embodiments are illustrative rather than restrictive. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. In the device claims enumerating several units, several of these units can be embodied by one and the same item of hardware or software. The usage of the words first, second and third, et cetera, does not indicate any ordering. These words are to be interpreted as names.

The invention claimed is:

1. A lighting system for providing a refit lighting system for a vehicle, comprising:
   an electrical element, incapable of emitting light and comprising a resistance circuit, which electrical element replaces a light bulb of the vehicle and consumes a received power, such that a detection system of the vehicle capable of detecting a failure of the light bulb will conclude that the light bulb has not failed;
   a light source;
      a controller, configured to receive a first signal indicating the working status of the electrical element and control the light source generating a first light and a second light respectively based on the first signal.

2. A lighting system as claimed in claim 1, wherein the first signal represents any one of the working status according to which the power is fed to the electrical element or the status according to which an enable signal is transmitted to the electrical element.

3. A lighting system as claimed in claim 2, wherein the first light has a first intensity when the working status of the electrical element is OFF and the second light has a second intensity when the working status of the electrical element is ON.

4. A lighting system as claimed in claim 3, wherein the first light is the daytime running light and the second light is the position light.

5. A lighting system as claimed in claim 4, wherein the electrical element is placed at the location of a position light bulb of a vehicle.

6. A lighting system as claimed in claim 1, wherein the first signal is obtained from a second light source, having a synchronized working status, as the electrical element.

7. A lighting system as claimed in claim 1, further comprising:
   a detector, configured to detect the power consumption of the electrical element and generate a warning message when the electrical element is incapable of consuming the power.

8. A lighting system for providing a refit lighting system for a vehicle, comprising:
   an electrical element, incapable of emitting light and comprising a resistance circuit, which electrical element replaces a light bulb of the vehicle and consumes a received power, such that a detection system of the vehicle capable of detecting a failure of the light bulb will conclude that the light bulb has not failed;
   a light source;
   a controller, configured to receive a first signal indicating the working status of the electrical element and control the light source generating a first light and a second light respectively based on the first signal;
   wherein the first signal is transmitted from the electrical element to the controller in a wireless manner.

9. A lighting system as claimed in claim 8, wherein the first signal represents any one of the working status according to which the power is fed to the electrical element or the status according to which an enable signal is transmitted to the electrical element.

10. A lighting system as claimed in claim 9, wherein the first light has a first intensity when the working status of the electrical element is OFF and the second light has a second intensity when the working status of the electrical element is ON.

11. A lighting system as claimed in claim 10, wherein the first light is the daytime running light and the second light is the position light.

12. A lighting system as claimed in claim 11, wherein the electrical element is placed at the location of a position light bulb of a vehicle.

13. A lighting system as claimed in claim 8, further comprising:
   a detector, configured to detect the power consumption of the electrical element and generate a warning message when the electrical element is incapable of consuming the power.

14. A lighting system as claimed in claim 8, wherein the first signal is obtained from a second light source, having a synchronized working status, as the electrical element.

15. A method of generating light, comprising the steps of:
   a) receiving a first signal indicating the working status of an electrical element, which electrical element is incapable of emitting light, and wherein the electrical element replaces a light bulb of the vehicle and consumes a received power, such that a detection system of the vehicle capable of detecting a failure of the light bulb will conclude that the light bulb has not failed;
   b) controlling a light source to generate a first light or a second light, based on the first signal.

16. A method as claimed in claim 15, further comprising a step of: c) detecting the power consumption of the electrical element and generating a warning message when the electrical element is incapable of consuming the power.

17. A method as claimed in claim 15, wherein the first signal is obtained from a cable connected to the electrical element, or is transmitted from the electrical element to the controller in a wireless manner, or is obtained from a cable connected to a second light source, having a synchronized working status, as the electrical element.

18. A method as claimed in claim 15, wherein the step b) further comprises the steps of:
   i). generating the first light having a first intensity when the working status of the electrical element is OFF; and
   ii). generating the second light having a second intensity when the working status of the electrical element is ON.

19. A method as claimed in claim 18, wherein the electrical element comprises a resistance.

* * * * *